US006996537B2

(12) United States Patent
Minear et al.

(10) Patent No.: US 6,996,537 B2
(45) Date of Patent: Feb. 7, 2006

(54) SYSTEM AND METHOD FOR PROVIDING SUBSCRIBED APPLICATIONS ON WIRELESS DEVICES OVER A WIRELESS NETWORK

(75) Inventors: Brian Minear, San Diego, CA (US); Richard Wayne Gardner, III, Solana Beach, CA (US); Stephen A. Sprigg, Poway, CA (US); Phil Tien Nguyen, San Diego, CA (US); Mitchell B. Oliver, San Diego, CA (US); Eric J. Lekven, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/929,220

(22) Filed: Aug. 13, 2001

(65) Prior Publication Data

US 2003/0033209 A1 Feb. 13, 2003

(51) Int. Cl.
*G06F 17/60* (2006.01)
(52) U.S. Cl. .................................................... 705/26
(58) Field of Classification Search ................ 705/26, 705/27, 57, 759
See application file for complete search history.

(56) References Cited

U.S. PATENT DOCUMENTS

| 5,619,247 | A | * | 4/1997 | Russo | 725/104 |
| 5,634,012 | A | * | 5/1997 | Stefik et al. | 705/39 |
| 5,761,485 | A | * | 6/1998 | Munyan | 345/839 |
| 5,956,034 | A | * | 9/1999 | Sachs et al. | 345/776 |
| 5,986,690 | A | * | 11/1999 | Hendricks | 725/60 |
| 6,453,160 | B1 | * | 9/2002 | Thomas et al. | 455/419 |

(Continued)

FOREIGN PATENT DOCUMENTS

JP 11-069017 * 9/1999

OTHER PUBLICATIONS

Goldenberg-Hart, Diane "A Glossary of Selected Internet and Computing Terms", Yale University Library, Jun. 1996. Retrieved from http://www.library.yale.edu/ref/internet/intgloss.htm on Nov. 12, 2004.*
No Author, "AvantGo 4.0 powers wireless applications and services", Customer Inter@action Solutions, May 2001, vol. 19, Iss. 11, p. 71. Retrieved from ProQuest on Nov. 11, 2004.*

(Continued)

*Primary Examiner*—Jeffrey A. Smith
*Assistant Examiner*—Naeem Haq
(74) *Attorney, Agent, or Firm*—Philip R. Wadsworth; Robert J. O'Connell (57) ABSTRACT

A system and method for the provision of downloadable subscription-based software applications to one or more wireless devices where the applications are downloadable from one or more application download servers across a wireless network. An accounting module receives subscription-based application download data from the one or more application download servers for each subscription-based application downloaded by a wireless device, and subscription-based application deletion data from each wireless device that has deleted a subscription-based application. The accounting module accounts for the use of the subscribed software applications based upon the subscription-based software application download data and subscription-based application deletion data.

33 Claims, 4 Drawing Sheets

U.S. PATENT DOCUMENTS

| | | | |
|---|---|---|---|
| 2001/0036271 A1* | 11/2001 | Javed | 380/217 |
| 2001/0037304 A1* | 11/2001 | Paiz | 705/52 |
| 2002/0029347 A1* | 3/2002 | Edelman | 713/193 |
| 2002/0049717 A1* | 4/2002 | Routtenberg et al. | 707/1 |
| 2002/0062290 A1* | 5/2002 | Ricci | 705/59 |
| 2002/0083006 A1* | 6/2002 | Headings et al. | 705/59 |
| 2002/0107809 A1* | 8/2002 | Biddle et al. | 705/59 |
| 2002/0162112 A1* | 10/2002 | Javed | 725/87 |
| 2002/0164025 A1* | 11/2002 | Raiz et al. | 380/231 |

OTHER PUBLICATIONS

Dialog File: 16, Acc#: 08832890 "Sony Pictures to sell movies via Internet", Jul. 9, 2001.*

No Author, "CyberSource Begins to Offer Software of Symantec and Others on the Internet", Wall Street Journal, Jan. 31, 1995. Retreived from Dialog File: 16, Acc#: 03736326.*

* cited by examiner

| Application | Client ID | Client Phone No. | Phone Model | Carrier | Region | Download Date | Deleted |
|---|---|---|---|---|---|---|---|
| Chess | 9002x | (111) 111-1111 | SonyTM 3250 | ATTTM | CA | 16Dec2000 | 0 |
| Golf Score Keeper | 9003x | (222) 222-2222 | SamsungTM 9840 | VerizonTM | CA | 3May2000 | 0 |
| Stock Monitor | 9004x | (333) 333-3333 | QwestTM 2001 | QRSTU | NV | 4Sep2000 | 1 |

SYSTEM AND METHOD FOR PROVIDING SUBSCRIBED APPLICATIONS ON WIRELESS DEVICES OVER A WIRELESS NETWORK

BACKGROUND OF THE INVENTION

I. Field of the Invention

The present invention generally relates to data networks and computer communications across the data networks. More particularly, the invention relates to the provision of software applications that require a subscription for authorized use thereof being installed on wireless devices from one or more application download servers on a wireless data network, and the subscription is automatically accounted for on a server-side accounting module until the subscribed application is deleted from the wireless device.

II. Description of the Related Art

Wireless devices, such as cellular telephones, communicate packets including voice and data over a wireless network. Cellular telephones themselves are being manufactured with increased computing capabilities and are becoming tantamount to personal computers and hand-held personal digital assistants ("PDAs"). These "smart" cellular telephone have installed application programming interfaces ("APIs") onto their local computer platform that allow software developers to create software applications that operate on the cellular telephone. The API sits between the wireless device system software and the software application, making the cellular telephone functionality available to the application without requiring the software developer to have the specific cellular telephone system source code.

The software applications can come pre-loaded at the time the wireless telephone is manufactured, or the user may later request that additional programs be downloaded over cellular telecommunication carrier networks, where the programs are executable on the wireless telephone. As a result, users of wireless telephones can customize their wireless telephones with programs, such as games, printed media, stock updates, news, or any other type of information or program available for download through the wireless network. Some of the software applications are downloadable to the user only if the user has a paid a fee to the provider of the software applications. And in some existing computer networks, software applications are only downloadable if the user subscribes to the use the software application such that the user is billed at periodic intervals for the use of the application.

The provider typically insures that only authorized users have access to cost-based applications through the provision of licenses within the software application itself. The wireless device API normally checks the software either at the time execution is requested or at some other period to determine if the software is licensed for use on the computer platform of the wireless device. As long as the license is current, the software application can be executed on the platform. However, most software licenses have a finite duration for which they will permit the user to have access to the licensed application. For some applications, the license is of a lasting duration and the user is billed for the application based upon the date when the application was downloaded.

In existing wireless networks, if the user of the wireless device desires to download and use a subscription-based software application, the user will typically either call a service provider or contact the service provider through other means, such as through an Internet access, and the service provider will either transmit the subscribed application to the wireless device across the wireless network or allow the user access to secure site where the subscription-based application is downloadable or accessible. To end the subscription of the application that has been downloaded to or is accessible from the wireless device, the user typically has to make an affirmative step to end the subscription, such as contacting the service provider from the wireless device, which can be expensive, or waiting until a less expensive connection can be made, such as from a land-based telephone line or an Internet connection.

Accordingly, it would be advantageous to provide a system and method whereby a subscription-based software application can be downloaded to wireless devices and accounted for by the application provider, while still permitting the user easy removal of the subscription-based application with virtually concurrent cessation of billing for the application subscription. Further, such subscription-based software application should be easily removed from the wireless device without significant action required by the user of the wireless device to contact the software application provider to have the subscription discontinued. It is thus to the provision of such a system and method that can account for the use of subscription-based software applications on wireless devices that the present invention is primarily directed.

SUMMARY OF THE INVENTION

The present invention is a system and method for the provision of downloadable subscription-based software applications on one or more wireless devices where the applications were downloaded from one or more application download servers across a wireless network. The subscription-based software application can be treated as a regular application resident on the wireless device, or alternately, the subscription-based application can include a license indicating that the application is subscription-based. An accounting module receives subscription-based application download data from the one or more application download servers for each subscription-based application downloaded by a wireless device, and subscription-based application deletion data from each wireless device that has deleted a subscription-based application. The system includes one or more wireless devices, such as a cellular telephone, personal digital assistant (PDA), pager, or other wireless computer platform. Each wireless device is in selective communication with a wireless network, such as a cellular network, and the wireless device can selectively download one or more subscription-based software applications, such as a game, news feed, stock quotes, or the like, whereby the subscription-based application is installed and executable on the wireless device.

The system also includes one or more application download servers where each application download server selectively communicates with the one or more wireless devices across the wireless network and, in response to requests from the wireless devices, downloads to wireless devices subscription-based software applications. Each application download server generates application download data for each subscription-based software application downloaded by a wireless device therefrom for tracking which wireless device downloaded which subscription-based application.

The accounting module, preferably implemented in software, accounts for the use of subscription-based software applications by each wireless device based upon the subscription-based software application download data received from the application download servers and subscription-based application deletion data received from the wireless devices. The accounting module can be resident on either one of the application download servers, the application download server from which a subscription-based software application was downloaded, or on any computer platform on the wireless network or server-side network.

In one embodiment, upon deletion of a subscription-based software application, the wireless device bridges a communication link with the one or more application download servers and transmits subscription-based application deletion data to the one or more download servers, which in turn transmit the deletion data to the accounting module if the accounting module is not resident on that server. Alternately, the accounting module selectively receives subscription-based application deletion data transmitted directly from a wireless device.

The invention also includes a method for providing downloadable subscription-based software on the one or more wireless devices in selective communication with one or more application download servers across a wireless network including the steps of selectively downloading one or more subscription-based software applications from an application download server to a wireless device whereby the subscription-based software is executable on the wireless device, and then generating at the application download server subscription-based application download data for each subscription-based software application downloaded by a wireless device therefrom. The method then includes the steps of selectively transmitting subscription-based application deletion data from each wireless device that has deleted a subscription-based software application to the accounting module, and accounting for the use of subscription-based software applications by each wireless device on the accounting module where the accounting is based upon the subscription-based software application download data and subscription-based application deletion data. The method also further preferably includes the step of, prior to the step of selectively transmitting subscription-based application deletion data from each wireless device, the wireless device bridging a communication link to the one or more application download servers after the wireless device has deleted a subscription-based software application. An example of bridging a communication link is effecting a cellular teleconnection.

The step of accounting for the use of subscription-based software applications by each wireless device can occur on an accounting module resident on the application download server from which a subscription-based software application was downloaded, on an accounting module resident on an application download server, or on an accounting module located remotely from the application download servers.

In one embodiment, the method can further include the step of receiving the transmitted subscription-based application deletion data at an application download server and sending the subscription-based application deletion data to the accounting module for the accounting step. Alternately, the step of selectively transmitting subscription-based application deletion data from each wireless device to an accounting module can be selectively transmitting subscription-based application deletion data from each wireless device directly to the accounting module located remotely from the one or more application download servers.

The invention also provides an accounting module specifically for accounting for the use of the subscription-based software applications by the one or more wireless devices. The accounting is performed primarily based upon subscription-based application download data supplied from each application download server for each subscription-based software application downloaded by a wireless device therefrom, and subscription-based application deletion data supplied from each wireless device that has deleted a subscription-based software application.

It is therefore the primary object of the present invention to provide a system and method whereby a subscription-based software application can be downloaded to wireless devices from one or more application download servers, and the wireless devices provides data indicative of deletion of the subscription-based application such that the use of the subscribed applications can be accounted for by the application provider without having to constantly determine if the subscription-based application is present on the wireless device. Further, the user can easily delete the subscription-based application and cause virtually concurrent cessation of billing for the application subscription. The present invention thus provides an advantage to the user of the wireless device in that the subscription-based software application can be easily removed from the wireless device without significant action taken by the user of the wireless device to contact the software application provider to have the subscription discontinued.

Other objects, advantages, and features of the present invention will become apparent after review of the hereinafter set forth Brief Description of the Drawings, Detailed Description of the Invention, and the Claims.

DETAILED DESCRIPTION OF THE INVENTION

Figure 1:
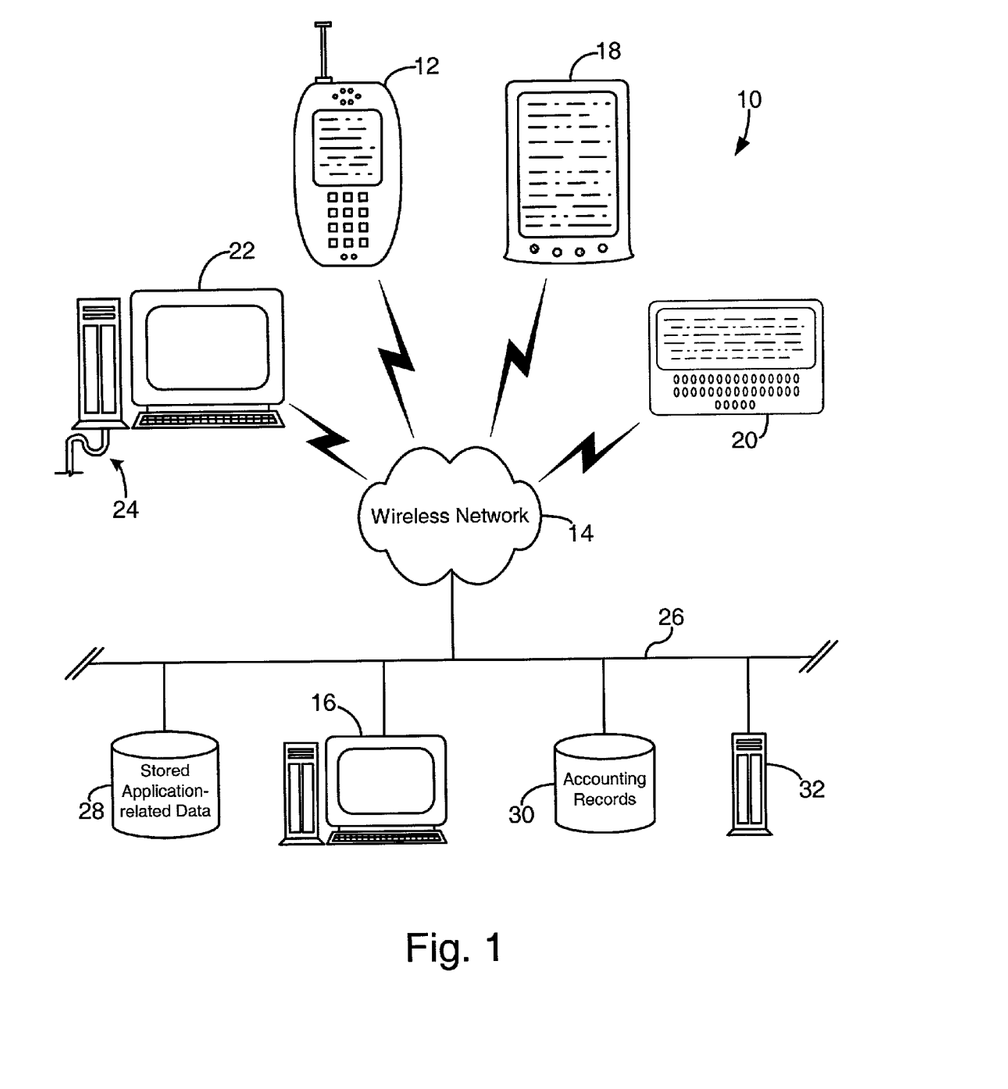
FIG. 1 is a representative diagram of a wireless network and the computer hardware and wireless devices that can be used within the inventive system.

With reference to the figures in which like numerals represent like elements throughout, FIG. 1 illustrates the present inventive system 10 for providing subscribed software applications to one or more wireless devices, such as cellular telephone 12, in communication across a wireless network 14 with at least one application download server 16 that selectively downloads subscribed software applications to the wireless devices across a wireless communication portal or other data access to the wireless network 14. As shown here, the wireless device can be a cellular telephone 12, a personal digital assistant 18, a pager 20, which is shown here as a two-way text pager, or even a separate computer platform 22 that has a wireless communication portal, and may otherwise have a wired connection 24 to a network or the Internet. The inventive system 10 can thus be performed on any form of remote module including a wireless communication portal, including without limitation, wireless modems, PCMCIA cards, access terminals, personal computers, access terminals, telephones without a display or keypad, or any combination or sub-combination thereof.

The application download server 16 is shown here on a local server-side network 26 with other computer elements in communication with the wireless network 14. There is also shown a stand-alone accounting server 32 and a accounting records database 30 which perform the accounting functions as herein described; however, accounting server 32 and database 30 are not necessary as all server-side functions can be performed on one server, such as application download server 16. Further, any computer server-side computer platform can provide separate services and processes to the wireless devices 12,18,20,22 across the wireless network 14.

The stored-application-related database 28 preferably contains stored-application related data to include the records for the specific applications downloaded by specific wireless devices 12,18,20,22, from the server through the wireless network 14. The records can then be used to generate the subscription-based download data requisite to bill the users of the wireless devices for the applications downloaded thereto.

Figure 2:
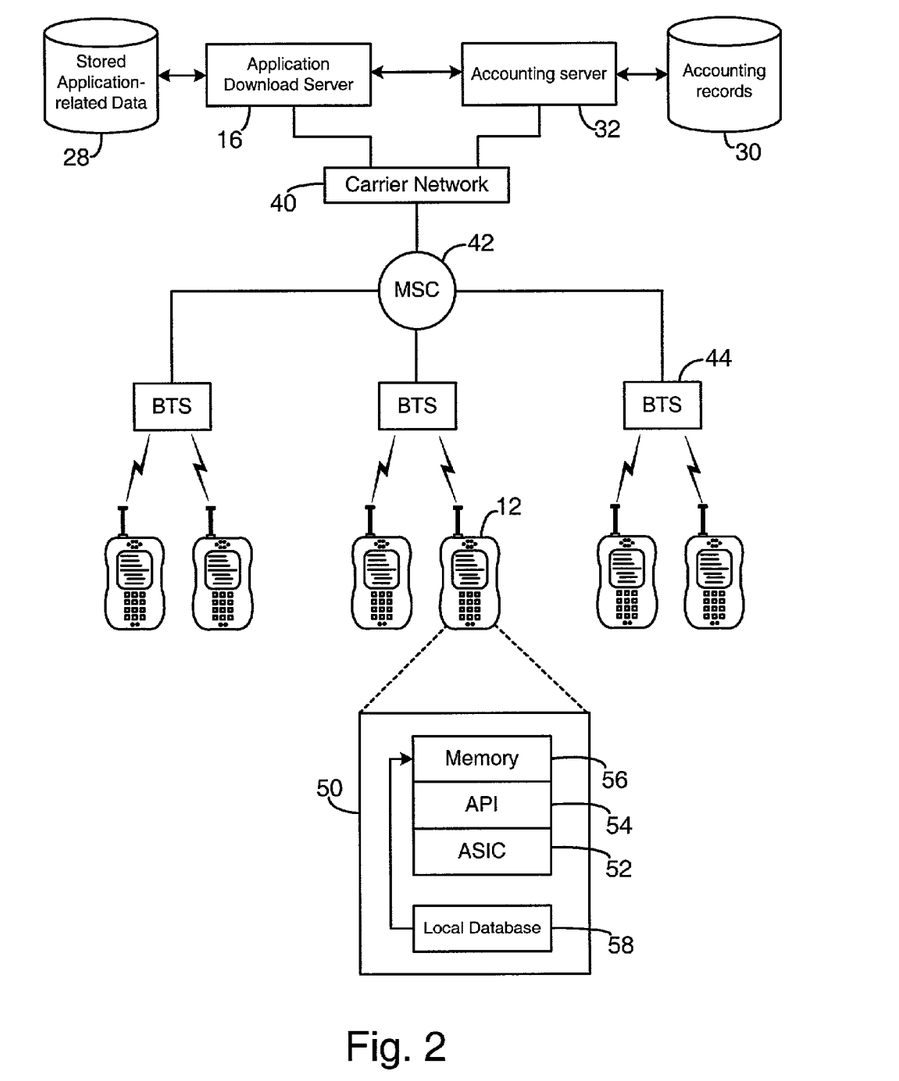
FIG. 2 is a block diagram of the hardware components of the wireless network providing communication between different wireless devices, the application download server, the accounting server, and their respective databases.

In FIG. 2, a block diagram is shown that more fully illustrates the components of the wireless network 14 and interrelation of the elements of the present inventive system 10. The wireless network 14 is merely exemplary and can include any system whereby remote modules, such as wireless devices 12,18,20,22, communicate over-the-air between and among each other and/or between and among components of a wireless network 14, including, without limitation, wireless network carriers and/or servers. The application download server 16 and the stored application-related database 28, and accounting server 32 and accounting records database 30, and any other components which are needed to provide cellular telecommunication services. The application download server 16 and/or accounting server 32 communicate with a carrier network 40, through a data link, such as the Internet, a secure LAN, WAN, or other network. The carrier network 40 controls messages (sent as data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications transmitted from the application download server 16. The computer platform 50 includes an application-specific integrated circuit ("ASIC") 52, or other processor, microprocessor, logic circuit, or other data processing device. The ASIC 52 is installed at the time of manufacture of the wireless device and is not normally upgradeable. The ASIC 52 or other processor executes the application programming interface ("API") layer that interfaces with any resident programs in the memory 56 of the wireless device. The memory can be comprised of read-only or random-access memory (RAM and ROM), EPROM, EEPROM, flash cards, or any memory common to computer platforms. The computer platform 50 also includes a local database 58 that can hold applications not actively used in memory 56, such as the subscription-based software applications downloaded from the application download server 16. The local database 58 is typically a flash memory cell, but can be any secondary or tertiary storage device as known in the art, such as magnetic media, EPROM, EEPROM, optical media, tape, or soft or hard disk.

The wireless device, such as cellular telephone 12, can download subscription-based applications, such as games, news, sports data, stock monitors, and the like, to be held the local database 58 when not in use. The subscription-based software application can be treated as a regular software application resident on the wireless device 12,18,20,22, and the only way to access the application is to obtain a subscription to have download access to the application on the application download server 16. Alternately, the subscription-based application can include a license indicating that the application is subscription-based. The wireless device can then selectively upload stored resident applications, to include subscription-based applications, from the local database 58 to memory 56 for execution on the API 54 when so desired by the user. The user of the wireless device 12,18,20,22 can also selectively delete a software application from the local database, and if the software application was subscription-based, the application provider for use of the subscribed software application should no longer charge the user. Thus, the deletion of the subscription-based application must be communicated to the accounting module.

The system 10 uses an accounting module to account for the use of the subscription-based application based upon the date when the wireless device 12,18,20,22 downloaded the application, and the date when the wireless device deletes the software-application. The accounting module, which is preferably a software application that can be a stand-alone module or can be integrated into a larger software application, receives subscription-based application download data from the one or more application download servers, such as server 16, for each subscription-based application downloaded by a wireless device 12,18,20,22, and subscription-based application deletion data from each wireless device 12,18,20,22 that has deleted a subscription-based application. In such manner, the usage of the subscribed application can be billed solely based upon the download date and deletion date of the subscribed application. Although, other downloads and interconnections can be made between the application download server 16 and the wireless device 12,18,20,22, such as updating the application, and such interconnection can update the accounting records database 30. The accounting module can be resident the application download server 16, and specifically the application download server 16 from which a subscription-based software application was downloaded, or can be resident on any computer platform resident on the server-side network 26 or wireless network 14.

Figure 3:
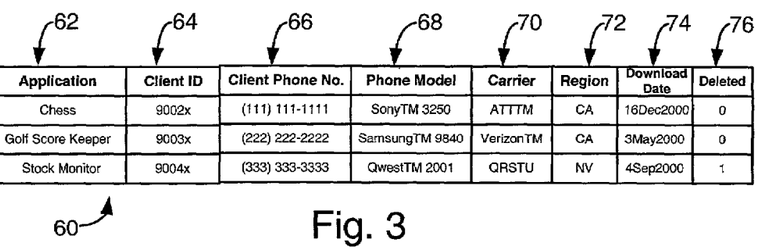
FIG. 3 is a file table resident on the application download server and/or stored application-related database identifying the software applications that are downloaded and/or deleted on specific wireless devices.

FIG. 3 illustrates a table 60 of the subscription-based application data held resident on the application download server 16 or stored application-related database 28, and which is sent to the accounting module wherever resident in the system 10. The application column 62 holds three software applications, shown here as chess, a golf score keeper, and a stock monitor, and the specific client identification number 64 that has downloaded the particular application. The table 60 also has other client and application related data, such as the client phone number 66, the specific phone model 68, the carrier for telecommunication service 70, and the region of the carrier 72. The table 60 also includes the download date column 74 containing the specific dates the applications were downloaded. The table 60 also includes an optional deletion column 76 such that the application download server can track if the wireless device deleted a specific application, from application column 62. The deletion column 76 includes a single bit wherein 0 indicates that no deletion signal has been received, and 1 indicates that the user has deleted the application. Thus, the stock monitor application in table 60 has been deleted by the wireless device. The application download server 16 can keep the date of deletion if necessary, but at the least, relays the deletion data to the accounting module so that proper accounting for the duration of the subscription of the application can occur. The table 60 can be held in any relational, entity-relational, or object-oriented database on the application download server 16 or on the stored application-related database 28.

Figure 4A:
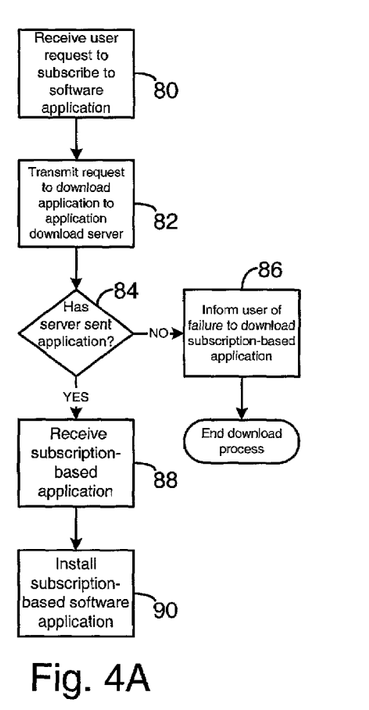
FIG. 4A is a flowchart illustrating the process on a wireless device of downloading and installing a subscription-based software application.
Figure 4B:
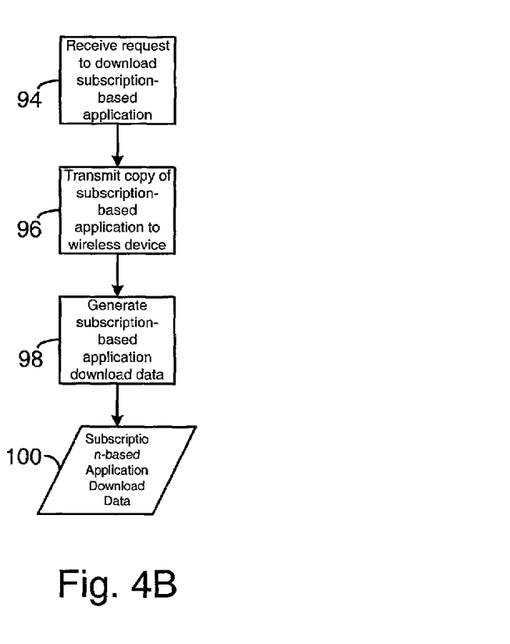
FIG. 4B is a flowchart illustrating the process at the application download server in transmitting a copy of a subscribed software application to the wireless device, this process in conjunction with the process of FIG. 4A on the wireless device.

As shown in FIG. 4A, in operation of the system 10, the wireless device 12,18,20,22 receives a request to subscribe to a software application, as shown at step 80, and then the wireless device transmits a request to the application download server 16, as shown at step 82, to have the application subscribed to and downloaded. The application download server 16, as shown in FIG. 4B, receives the request to download the subscription-based application, as shown at step 94, transmits a copy of the subscription-based application to the wireless device, as shown at step 96. Either at the same time as step 96 or at some time thereafter, the application download server 16 generates the subscription-based application download data, as shown at step 98, and then outputs the subscription-based application download data, as shown as data 100.

On the wireless device side, a determination is made as to whether the application download server has transmitted the application, as shown at decision 34. If the application has not been sent, then the user is informed of the failure to download the subscription-based application download data, as shown at step 86, and then the download process terminates. Otherwise, if the application download server 16 has sent the subscription-based application at decision 84, then the wireless device 12,18,20,22 receives the subscription-based application, as shown at step 88, and the subscription-based application is installed on the wireless device, as shown at step 90, and the downloaded process terminates. In downloading the application, the wireless device 12,18,20, 22 has subscribed to the application and the user/owner of the wireless device will be billed under whatever terms the subscription entails, which is typically a recurrent periodic fee.

Figure 5:
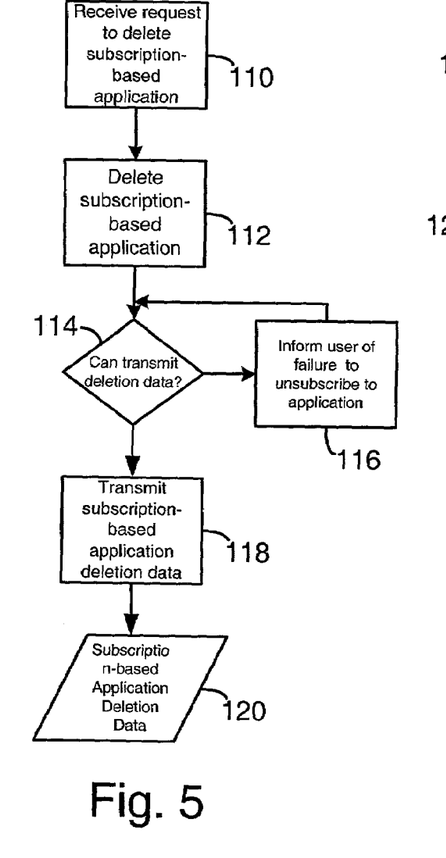
FIG. 5 is a flowchart illustrating the process of the wireless device deleting a subscription-based application and transmitting the subscription-based application deletion data indicative of the deletion to the accounting module, either directly or indirectly.

With reference to FIG. 5, when the user desires to remove the subscription-based application from the wireless device 12,18,20,22, the wireless device receives the request from the user to delete the application, as shown at step 110, and then the wireless device deletes the subscription-based application completely from the wireless device, i.e. deleted from local database 58 and memory 56. The wireless device then attempts to transmit, at the same time as step 112 or thereafter, the subscription-based application deletion data to the accounting module, and determines if the transmission as possible, as shown at decision 114. In other words, the wireless device must communicate the fact of the deletion of the application in order to have the user stopped being charged for the subscription, and for example, if the wireless device is out of the wireless network, then the wireless device must wait until back in network in order to communicate the subscription-based application deletion data. Thus, if the wireless device cannot transmit the deletion data at decision 114, the user is informed of the failure to unsubscribe from the application and the device enters a wait state at decision 114 until the subscription-based application deletion data can be transmitted. Once the deletion data can be transmitted at decision 114, then the subscription-based application deletion data is transmitted from the wireless device, as shown at step 118, and the process terminates with the output of the subscription-based application deletion data, as shown as data 120.

Figure 6:
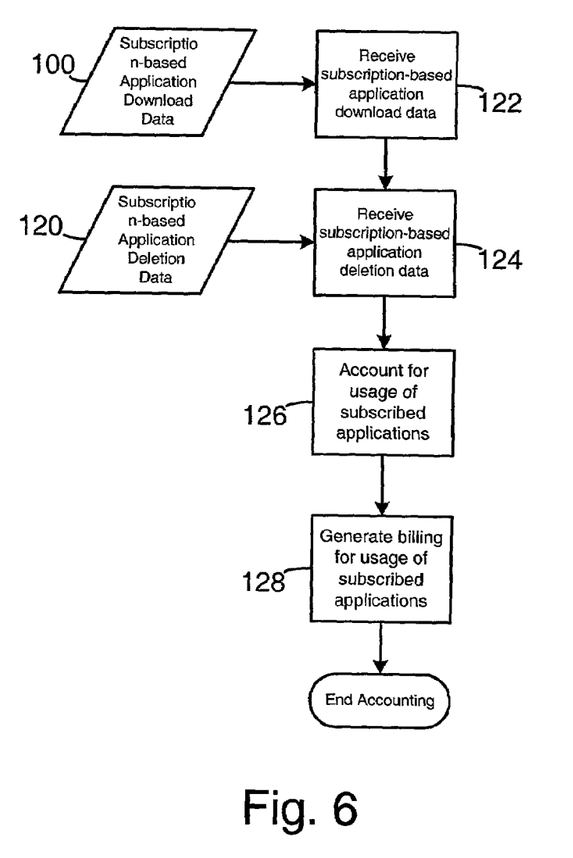
FIG. 6 is a flowchart illustrating the accounting module's process of accounting for usage of subscribed software applications based upon the subscription-based application download data and subscription-based application deletion data.

The accounting method of the accounting module is shown in the flowchart of FIG. 6. The accounting module, wherever resident, receives the subscription-based application download data 100 from one or more application download servers, such as application download server 16, as shown at step 122, and also receives the subscription-based application deletion data 120 from the one or more wireless devices 12,18,20,22, as shown at step 124. The particular order of receipt of the data is irrelevant as long as both data are present so that the accounting process can occur. As shown at step 126, the accounting module then accounts for the usage of subscribed applications by the wireless devices based upon the download date and deletion date for each application. The accounting module then generates billing information for usage of the subscribed applications, as shown at step 128, and then the accounting process terminates. The accounting module perform a wide variety of accounting functions such as generation of simple billing information to full generation of the actual bill to the user/owner of the wireless device.

In order to transmit the subscription-based application deletion data, the wireless device 12,18,20,22 preferably bridges a communication link to the one or more application download servers, such as application download server 16, such as making a cellular teleconnection to a server. The receiving application download server 16 then forwards the deletion data to the accounting module for processing as shown in FIG. 6. Alternately, the transmission of the subscription-based application deletion data from each wireless device 12,18,20,22 to the accounting module can be direct to the accounting module located remotely from the one or more application download servers, such as a separate accounting server 32.

In view of the inventive method and module, the present invention includes a program resident in a computer readable medium, where the program directs a wireless device having a computer platform to perform the inventive steps of the method. The computer readable medium can be the memory 56 of the computer platform 50 of the cellular telephone 12, or other wireless device, or can be in a local database, such as local database 58 of the cellular telephone 12. Further, the computer readable medium can be in a secondary storage media that is loadable onto a wireless device computer platform, such as a magnetic disk or tape, optical disk, hard disk, flash memory, or other storage media as is known in the art.

In the context of FIGS. 4A–6, the present inventive methods may be implemented, for example, by operating portion(s) of the wireless network 14 to execute a sequence of machine-readable instructions, such as wireless platform 50, the application download servers 16, and accounting server 32. The instructions can reside in various types of signal-bearing or data storage primary, secondary, or tertiary media. The media may comprise, for example, RAM (not shown) accessible by, or residing within, the components of the wireless network 14. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A system for providing downloadable subscription-based software to one or more wireless devices, comprising:

one or more wireless devices, each wireless device in selective communication with a wireless network and selectively downloading one or more subscription-based software applications to be executable on the wireless device, and each wireless device being configured to passively transmit subscription-based application deletion data for any downloaded subscription-based application that has been deleted by the wireless device, wherein each device is configured to transmit voice communication from a user to the wireless network;

one or more application download servers, each application download server communicating with the one or more wireless devices across the wireless network and downloading to the wireless devices at least one subscription-based software application, each application download server generating subscription-based application download data for each subscription-based software application downloaded by a wireless device therefrom; and an accounting module to account for the use of subscription-based software applications by each wireless device, the accounting module receiving subscription-based application download data from the one or more application download servers and subscription-based application deletion data from each wireless device, and wherein the accounting is based upon the subscription-based software application download data and subscription-based application deletion data.

2. The system of claim 1, wherein the accounting module is resident on the application download server from which a subscription-based software application was downloaded.

3. The system of claim 1, wherein the accounting module is resident on an application download server.

4. The system of claim 1, wherein upon deletion of a subscription-based software application, the wireless device bridges a communication link with the one or more application download servers and transmits subscription-based application deletion data to the one or more application download servers.

5. The system of claim 4, wherein the one or more application download servers receive subscription-based application deletion data from a wireless device and send the subscription-based application deletion data to the accounting module.

6. The system of claim 5, wherein the accounting module receives subscription-based application deletion data transmitted from the one or more download servers.

7. The system of claim 1, wherein the accounting module receives subscription-based application deletion data directly from a wireless device that has deleted a subscription-based application.

8. The system of claim 1, wherein the wireless device is a cellular telephone.

9. The system of claim 1, wherein the wireless device is a personal digital assistant.

10. The system of claim 1, wherein the wireless device is a pager.

11. A system for providing downloadable subscription-based software across a wireless network, comprising:

wireless communication means for selectively communicating with the wireless network and downloading one or more subscription-based software applications to be executable on the wireless communication means, the wireless communication means being configured to passively transmit subscription-based application deletion data for any downloaded subscription-based application that has been deleted by the wireless communication means, wherein the wireless communication means includes a wireless device configured to transmit voice communication from a user to the wireless network;

application download means for communicating with the wireless communication means across the wireless network and downloading at least one subscription-based software application thereto, each application download means generating software application download data for each subscription-based software application downloaded to a wireless communication means therefrom; and an accounting means for accounting for the use of the subscription-based software application by the wireless communication means, the accounting means receiving subscription-based software application download data from the application download means and subscription-based application deletion data from the wireless communication means, and wherein the accounting is based upon the subscription-based application download data and subscription-based application deletion data.

12. A method for providing downloadable subscription-based software on one or more wireless devices in selective communication with one or more application download servers across a wireless network, the method comprising the steps of:

downloading one or more subscription-based software applications from an application download server to a wireless device, the downloaded subscription-based software applications executable on the wireless device, wherein the wireless device is configured to transmit voice communication from a user to the wireless network;

generating at the application download server subscription-based application download data for each subscription-based software application downloaded by a wireless device therefrom;

passively transmitting subscription-based application deletion data from each wireless device that has deleted a subscription-based software application to an accounting module; and accounting for the use of subscription-based software applications by each wireless device on the accounting module, the accounting based upon the subscription-based software application download data and subscription-based application deletion data.

13. The method of claim 12, wherein the step of accounting for the use of subscription-based software applications by each wireless device occurs on an accounting module resident on the application download server from which a subscription-based software application was downloaded.

14. The method of claim 12, wherein the step of accounting for the use of subscription-based software applications by each wireless device occurs on an accounting module resident on an application download server.

15. The method of claim 12, further comprising the step of, prior to the step of transmitting subscription-based application deletion data from each wireless device, the wireless device bridging a communication link to the one or more application download servers after the wireless device has deleted a subscription-based software application.

16. The method of claim 12, wherein the step of accounting for the use of subscription-based software applications by each wireless device occurs on an accounting module located remotely from the one or more application download servers.

17. The method of claim 16, further comprising the steps of receiving the transmitted subscription-based application deletion data at an application download server and sending the subscription-based application deletion data to the accounting module.

18. The method of claim 16, wherein the step of transmitting subscription-based application deletion data from each wireless device to an accounting module is transmitting subscription-based application deletion data from each wireless device directly to the accounting module located remotely from the one or more application download servers.

19. A method for providing downloadable subscription-based software on one or more wireless devices in selective communication with one or more application download servers across a wireless network, the method comprising the steps of:

a download step for downloading one or more subscription-based software applications from an application download server to a wireless device, the subscription-based software applications executable on the wireless device, wherein the wireless device is configured to transmit voice communication from a user to the wireless network;

a subscription-based application download data generation step for generating at the application download server subscription-based application download data for each subscription-based software application downloaded by a wireless device therefrom;

a subscription-based application deletion data transmission step for passively transmitting subscription-based application deletion data from each wireless device that has deleted a subscription-based software application to an accounting module; and an accounting step for accounting for the use of subscription-based software applications by each wireless device on the accounting module, the accounting based upon the subscription-based software application download data and subscription-based application deletion data.

20. A computer-readable medium encoded with an accounting module for accounting for the use of subscription-based software applications by one or more wireless devices in selective communication with one or more application download servers across a wireless network, wherein each wireless device downloads from an application download server one or more subscription-based software applications to be executable on the wireless device and each wireless device that has deleted a subscription-based software application passively transmits subscription-based application deletion data to the accounting module, and each application download server generates application download data for each subscription-based software application downloaded by a wireless device therefrom, and wherein the accounting module receives subscription-based application download data from the one or more application download servers and subscription-based application deletion data from the one or more wireless devices, and accounts based upon the subscription-based application download data and the subscription-based application deletion data, wherein each wireless device is configured to transmit voice communication from a user to the wireless network.

21. The accounting module of claim 20, wherein the accounting module is resident on an application download server.

22. The accounting module of claim 20, wherein the accounting module is located remotely to the one or more application download servers.

23. The accounting module of claim 22, wherein the accounting module receives the subscription-based application deletion data from the one or more application download servers.

24. The accounting module of claim 20, wherein the accounting module receives the subscription-based application deletion data directly from the one or more wireless devices.

25. In a computer readable medium, a program that directs a computer to account for the use of subscription-based software applications by one or more wireless devices in selective communication with one or more application download servers across a wireless network through performing the steps of:

receiving subscription-based application download data from the one or more application download servers, the subscription-based application download data for each subscription-based software application downloaded by a wireless device from the one or more application download servers, wherein the wireless device is configured to transmit voice communication from a user to the wireless network;

receiving subscription-based application deletion data passively transmitted from each wireless device that has deleted a subscription-based software application; and accounting for the use of subscription-based software applications by each wireless device based upon the subscription-based software application download data and subscription-based application deletion data.

26. A system for providing downloadable subscription-based software to one or more wireless devices, comprising:
   one or more wireless devices, each wireless device operable to communicate with a wireless network and operable to download one or more subscription-based software applications to be executable on the wireless device, and each wireless device operable to passively transmit subscription-based application deletion data for any downloaded subscription-based software application that has been deleted by the wireless device;
   one or more application download servers, each application download server operable to communicate with the one or more wireless devices across the wireless network and operable to download to the wireless devices at least one subscription-based software application, each application download server operable to generate subscription-based application download data for each subscription-based software application downloaded by a wireless device therefrom; and
   an accounting module operable to account for the use of the subscription-based software applications by each wireless device, the accounting module operable to receive subscription-based application download data from the one or more application download servers and subscription-based application deletion data from each wireless device, and wherein the accounting is based upon the subscription-based software application download data and subscription-based application deletion data.

27. The system of claim 26, wherein the wireless network is a packet-switching network.

28. The system of claim 26, wherein upon the deletion of a subscription-based software application, the wireless device performing the deletion bridges a communication link with the one or more application download servers and transmits subscription-based application deletion data to the one or more application download servers.

29. The system of claim 28, wherein the one or more application download servers receive subscription-based application deletion data transmitted from the wireless device and send the subscription-based application deletion data to the accounting module.

30. A method for providing downloadable subscription-based software applications across a wireless network, the method comprising the steps of:
   receiving at a wireless device, over the wireless network, a subscription-based software application;
   deleting from the wireless device the subscription-based software application;
   passively generating subscription-based application deletion data associated with the deleting the subscription-based software application;
   transmitting from the wireless device, over the wireless network, the subscription-based application deletion data;
   an application download server operable to communicate with the wireless device across the wireless network and operable to download at least one subscription-based software application thereto, the application download server operable to generate subscription-based application download data for each subscription-based software application downloaded to the wireless device therefrom; and
   an accounting module operable to perform the accounting associated with the use of the subscription-based software application by the wireless device, the accounting module operable to receive the subscription-based application download data from the application download server and the subscription-based application deletion data from the wireless device, and wherein the accounting is based upon the subscription-based application download data and the subscription-based application deletion data.

31. The system of claim 30, wherein the wireless network is a packet-switching network.

32. The system of claim 30, wherein upon deletion of a subscription-based software application, the wireless device bridges a communication link with the application download server and transmits subscription-based application deletion data to the application download server.

33. A system for providing downloadable subscription-based software to one or more wireless devices, each wireless device operable to communicate with a wireless network and operable to download one or more subscription-based software applications to be executable on the wireless device, and each wireless device operable to transmit subscription-based application deletion data for any downloaded subscription-based software application that has been deleted by the wireless device, the system comprising:
   one or more application download servers, each application download server operable to communicate with the one or more wireless devices across the wireless network and operable to download to the wireless devices at least one subscription-based software application, each application download server operable to generate subscription-based application download data for each subscription-based software application downloaded by a wireless device therefrom; and
   an accounting module operable to account for the use of the subscription-based software applications by each wireless device, the accounting module operable to receive subscription-based application download data from the one or more application download servers and subscription-based application deletion data passively transmitted from at least one wireless device, and wherein the accounting is based upon the subscription-based software application download data and subscription-based application deletion data.

* * * * *